US006198786B1

(12) United States Patent
Carroll et al.

(10) Patent No.: US 6,198,786 B1
(45) Date of Patent: Mar. 6, 2001

(54) METHODS OF REACTOR SYSTEM PRESSURE CONTROL BY REACTOR CORE POWER MODULATION

(75) Inventors: Douglas G. Carroll, San Jose; Eugene C. Eckert, Los Gatos; Lamont H. Youngborg, San Jose; Nabil A. Tamer, Santa Clara, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/082,989

(22) Filed: May 22, 1998

(51) Int. Cl.[7] ....................................... G21C 7/32
(52) U.S. Cl. ................. 376/211; 376/207; 376/210; 376/216; 376/219; 376/241; 376/245; 376/259
(58) Field of Search ................. 376/210, 211, 376/216, 245, 241, 259, 219, 207

(56) References Cited

U.S. PATENT DOCUMENTS

| | | | |
|---|---|---|---|
| 4,150,546 | * | 4/1979 | Collett .................................. 60/644 |
| 4,472,345 | * | 9/1984 | Tanji et al. .......................... 376/211 |
| 5,268,939 | * | 12/1993 | Tang et al. .......................... 376/211 |

FOREIGN PATENT DOCUMENTS

| | | | |
|---|---|---|---|
| 0886244 | * | 11/1971 | (CA) .................................. 376/211 |
| 0034969 | * | 9/1981 | (EP) .................................. 376/216 |
| 53-090591 | * | 8/1978 | (JP) .................................. 376/211 |
| 59-133497 | * | 7/1984 | (JP) .................................. 376/211 |
| 61-193099 | * | 8/1986 | (JP) .................................. 376/216 |
| 62-118010 | * | 5/1987 | (JP) .................................. 376/211 |
| 62-131903 | * | 6/1987 | (JP) .................................. 376/211 |
| 63-129105 | * | 6/1988 | (JP) .................................. 376/211 |

\* cited by examiner

*Primary Examiner*—Charles T. Jordan
*Assistant Examiner*—Jack Keith
(74) *Attorney, Agent, or Firm*—Armstrong Teasdale LLP

(57) ABSTRACT

A method of controlling the system pressure in a power generating system, having a turbine-generator and a BWR, that modulates the core thermal power of the reactor while maintaining the main turbine control valves in a constant steady position is described. The core thermal power may be adjusted by adjusting the control rod density within the reactor core or by adjusting the flow rate through the reactor which may be accomplished by modulating the speed of variable frequency recirculation pumps or by modulating recirculation flow control valves. The method includes transferring the power generation system from normal turbine control valve modulation pressure control to core thermal power modulation pressure control. Additionally the method includes modifying the bypass valve closure bias and the power control bias to accommodate the variances from core power modulation pressure control over normal pressure control. If pressure transients are outside of predetermined safety ranges, the method provides for transferring system pressure control back to the standard turbine control valve modulation pressure control.

18 Claims, 4 Drawing Sheets

METHODS OF REACTOR SYSTEM PRESSURE CONTROL BY REACTOR CORE POWER MODULATION

FIELD OF THE INVENTION

This invention relates generally to the method of controlling reactor system pressure for a nuclear power plant and more particularly, to controlling the reactor system pressure of a boiling water reactor by reactor core power modulation.

BACKGROUND OF THE INVENTION

A conventional boiling water reactor (BWR) includes a pressure vessel containing a nuclear fuel core immersed in circulating coolant, i.e., water, which removes heat from the nuclear fuel. The water is boiled to generate steam for driving a steam turbine-generator for generating electric power. The steam is then condensed and the water is returned to the pressure vessel in a closed loop system. Piping circuits carry the heated water or steam to the steam generators and turbines and carry recirculated water or feedwater back to the pressure vessel that contains the nuclear fuel.

The BWR includes several conventional closed-loop control systems that control various individual operations of the BWR in response to demands. For example a control rod drive control system (CRDCS) controls the position of the control rods within the reactor core and thereby controls the rod density within the core which determines the reactivity therein, and which in turn determines the output power of the reactor core. A conventional recirculation flow control system (RFCS) is used to control core flow rate, which changes the steam/water relationship in the core and can be used to change the output power of the reactor core. These two control systems work in conjunction with each other to control, at any given point in time, the output power of the reactor core and thereby establish the electrical power output of the electric generating plant. A turbine control system (TCS) controls steam flow from the BWR to the turbine based on pressure regulation or load demand.

The operation of these systems, as well as other conventional systems, is controlled utilizing various monitoring parameters of the BWR. Some monitoring parameters include core flow and flow rate effected by the RFCS, reactor system pressure, which is the pressure of the steam discharged from the pressure vessel to the turbine that can be measured at the reactor dome or at the inlet to the turbine, neutron flux or core power, feedwater temperature and flow rate, steam flow rate provided to the turbine and various status indications of the BWR systems. Many monitoring parameters are measured directly by conventional sensors, while others, such as core thermal power, are conventionally calculated using measured parameters. Output from the conventional sensors and calculated parameters are input to an emergency protection system to assure safe shutdown of the plant, isolating the reactor from the outside environment if necessary, and preventing the reactor core from overheating during any emergency event.

Conventional pressure control of the BWR is provided by automatically adjusting the position of the main turbine control valves, or steam admission flow control valves to the turbine. The control system must maintain control valve position margin below valves-wide-open (VWO) so as to provide adequate reactor pressure control should the pressure rise for any reason. If the reactor pressure rises, the steam admission control valves will open beyond the initial position, thus restoring the reactor system pressure to its desired value. For a conventional pressure control system, the margin in steam flow between the normal desired operating point of the steam admission flow control valves compared to the steam flow where the steam admission flow control valves are wide open is required to be about 3% of rated steam flow to maintain adequate performance.

The main turbine control valves are controlled by a pressure regulation system and valve servo system which position the turbine inlet flow control valves. Also, several steam bypass valves are included in the plant design. These bypass valves are used for plant startup and to bypass excessive steam should the need arise. The pressure regulator uses system pressure as one input and pressure setpoint as the second input. Each of the main turbine control valves is typically controlled by a control valve servo loop which has a flow demand to valve position demand characterizer and the actual valve position as inputs to the control valve servo loop. The bypass valves are typically controlled by a similar servo loop. The bypass valves and in some cases, the main control valves are opened in a planned sequence according to steam flow demand needs.

The current BWR reactor system pressure regulation requires the main turbine control valves to change position or modulate to maintain reactor system pressure. As noted above, when the reactor pressure decreases, the control valves close to restore reactor system pressure to the desired value, or conversely, if the reactor system pressure increases the control valves open to reduce reactor system pressure to the desired value. As an example, for many BWR types of plants, the main turbine valves are typically operated in full arc mode, i.e., all turbine flow control valves move together, with average position near 50% of wide open. Control valve modulation is around this average valve position. If operation greater than about 60% valve position is attempted, the pressure control system will become less effective and steady plant operation can not usually be maintained. Other BWR plants operate in partial arc mode in which the turbine control valves are opened in a planned sequential order. In partial arc mode, conventional pressure control at full power is primarily accomplished with all but one turbine control valve wide open. The last turbine control valve modulates at a partially open position, typically about 30% of wide open. When the main turbine control valves are operating near their normal full power position, i.e., 50% open in full arc mode, the turbine control valves are passing less steam flow to the main turbine than if the valves were wide open for the same system pressure, and as a result less electrical output is generated. It would be desirable to operate a BWR plant under conditions that maximize electrical output and still maintain reactor system pressure within acceptable limits.

SUMMARY OF THE INVENTION

These and other objects may be attained by a method of controlling the system pressure in a power generating system, having a turbine-generator and a BWR, that modulates the core thermal power of the reactor while maintaining the main turbine control valves in a constant steady position. The constant steady position may be wide open, but may be any position that is greater than 75 percent of wide open. The core thermal power may be adjusted by adjusting the control rod density within the reactor core. Alternatively, the core thermal power may be adjusted by adjusting the flow rate through the reactor which may be accomplished by modulating the speed of variable frequency recirculation pumps or by modulating recirculation flow control valves.

The method includes transferring the power generation system from normal turbine control valve modulation pressure control to core thermal power modulation pressure control. Additionally the method includes modifying the bypass valve closure bias and the power control bias to accommodate the variances from core power modulation pressure control over normal pressure control. If pressure transients are outside of predetermined safety ranges, the method provides for transferring system pressure control back to the standard turbine control valve modulation pressure control.

The above described method enables BWR plants to operate the main turbine control valves wide open while maintaining reactor system pressure within acceptable limits. Operating the control valves wide open enables the plant to produce increased electrical output without enlarging the turbine or the generator.

DETAILED DESCRIPTION

Figure 1:
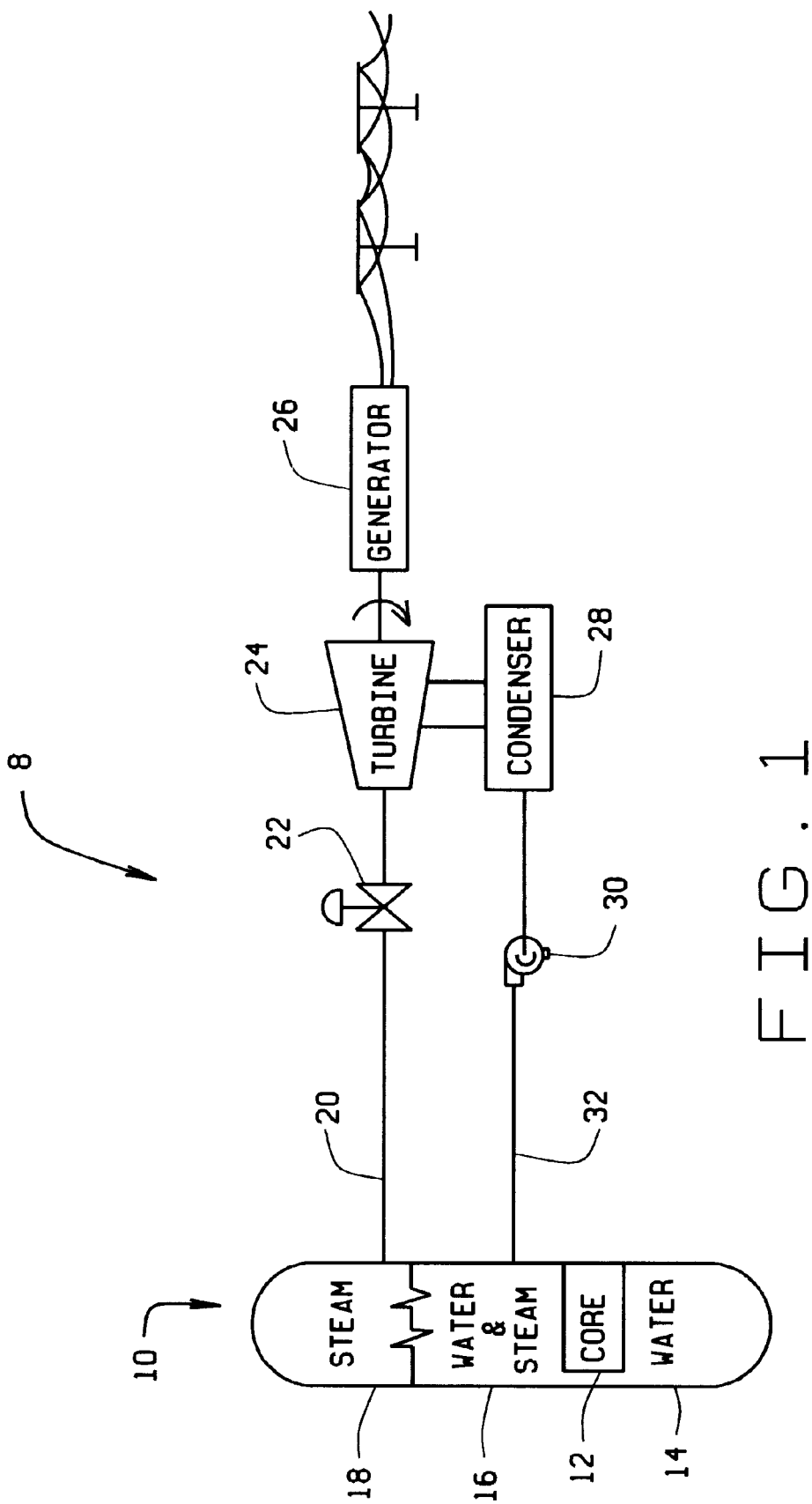
FIG. 1 is a schematic diagram of the basic parts of a power generating system that contains a turbine-generator and a BWR.

FIG. 1 is a schematic diagram of the basic parts of a power generating system 8. The system includes a BWR 10 which contains a reactor core 12. Water 14 is boiled using the thermal power of reactor core 12, passing through a water-steam phase 16 to become steam 18. Steam 18 flows through piping in a steam flow path 20 to a turbine flow control valve 22 which controls the amount of steam 18 entering steam turbine 24. Steam 18 is used to drive turbine 24 which in turn drives electric generator 26 creating electric power. Steam 18 flows to a condenser 28 where it is converted back to water 14. Water 14 is pumped by feedwater pump 30 through piping in a feedwater path 32 back to reactor 10. The above described system is generally referred to as a closed loop system.

The equations below show the basic relationships between the generation of power in the reactor core Q, the steam flow rate $\omega_s$, the feedwater flow rate $\omega_{FW}$, the reactor system pressure $P_s$ upstream of turbine control valve 22, the pressure $P_{cv}$, downstream of turbine control valve 22, and the pressure $P_c$ in condenser 28. Typically, the pressure in $P_c$ in condenser 28 is considered to be zero. Also, the main turbine control valve flow characteristic $C_v$, changes from a relatively small value to a large value as control valve 22 traverses from a nearly closed position to its wide open position. The flow coefficient of turbine 24 is expressed as $C_T$ which may be considered relatively constant for small changes in steam flow. Typically, the steam flow rate $\omega_s$ is equal to the feedwater flow rate $\omega_{FW}$ when there are no significant alternate sources of water into the reactor system nor any leakage from the reactor system. The following equations depict the basic steady state relationships were secondary variables, such as heat losses, pumping energy and leakage flows, are ignored. The basic equations for system pressure control by main turbine control valve modulation and core power modulation are developed below:

The steam flow $\omega_s$ is a function of turbine control valve 22 position $C_v$, and the pressure drop cross control valve 22 is the difference between the system pressure $P_s$ and the pressure down stream $P_{cv}$ of flow control valve 22, which can be expressed as:

$$\omega_s = C_v * \sqrt{P_s - P_{cv}} \qquad \text{Equation 1}$$

The steam flow through turbine control valve 22 and turbine 24 are equal when there are no shunt flow paths between turbine control valve 22 and the turbine inlet. The steam flow $\omega_s$ is a function of the turbine flow coefficient $C_T$, and the pressure difference between the pressure down stream $P_{cv}$ of turbine control valve 22 and condenser 28 pressure $P_c$ may be considered equal to zero relative to the system pressure $P_s$. The expression is:

$$\omega_s = C_T * (P_{CV} - 0) \qquad \text{Equation 2}$$

Equations 1 and 2 can be combined to calculate the system pressure $P_s$ in terms of turbine control valve 22 flow coefficient $C_v$, the turbine flow coefficient $C_T$ and the pressure down stream $P_{cv}$ of turbine control valve 22.

$$P_s = \left(\frac{C_T}{C_V}\right)^2 * P_{CV}^2 + P_{CV} \qquad \text{Equation 3}$$

The thermal power Q from reactor core 12 is approximately proportional to steam flow $\omega_s$. The proportionally constant K relates these two parameters. The equation for reactor core power is:

$$Q = K * \omega_s \qquad \text{Equation 4}$$

Combining Equations 2 and 4, the thermal power Q out of core 12 can be expressed as:

$$Q + K * C_T * P_{CV} \qquad \text{Equation 5}$$

Solving for the pressure down stream of turbine flow control valve 22 the equation becomes:

$$P_{CV} = \frac{Q}{K * C_T} \qquad \text{Equation 6}$$

Combining Equation 3 and Equation 6 the system pressure $P_s$ can be determined in terms of core 12 thermal power Q, the constant that relates core power to steam flow K, main turbine flow control valve coefficient $C_v$, and the turbine flow coefficient $C_T$:

$$P_S = \frac{Q^2}{C_V^2 * K^2} + \frac{Q}{C_T * K} \qquad \text{Equation 7}$$

For the variable which controls the system pressure $P_s$ for a conventional method of reactor pressure control by turbine flow control valve modulation, Equation 7 is rearranged to:

$$P_S = \left(\frac{1}{C_V^2}\right) * \left(\frac{Q^2}{K^2}\right) + \frac{Q}{C_T * K} \qquad \text{Equation 8}$$

The terms $$\left(\frac{Q^2}{K^2}\right) + \frac{Q}{C_T * K}$$

are relatively constant for constant reactor power. This equation shows that the reactor system pressure $P_s$ is proportional to the inverse of the square of the turbine control valve flow coefficient $C_v$, which is linearly proportional to the position of turbine control valve 22 position as previously discussed. When turbine flow control valve 22 closes in response to a decrease in reactor system pressure, the steam flow decreases in response to this flow control valve position change, thus reducing the steam flow rate which causes the reactor system pressure to increase to the desired value and vice versa.

For the variable which controls the system pressure $P_s$ for the method of reactor pressure control by modulation of the reactor power Q in accordance with the present invention, Equation 8 is rearranged to:

$$P_S = Q^2 * \left(\frac{1}{C_V^2 * K^2}\right) + Q * \left(\frac{1}{C^T * K}\right) \quad \text{Equation 9}$$

The terms $$\left(\frac{1}{C_V^2 * K^2}\right) + \left(\frac{1}{C_T * K}\right)$$

are relatively constant for constant steam flow. This equation shows that the reactor system pressure $P_s$ is proportional to the square of the core power Q for the term involving the control valve flow coefficient $C_v$ and linear with power for the term involving the turbine coefficient $C_T$. The power Q is actually changed by changes in the control rod density in the reactor core or by changes in the flow through the reactor core. When the control rod density decreases or the flow through the reactor core increases in response to a decrease in reactor system pressure, the core power increases, which in turn, causes the reactor system pressure to increase back to the desired value and vice versa.

Figure 2:
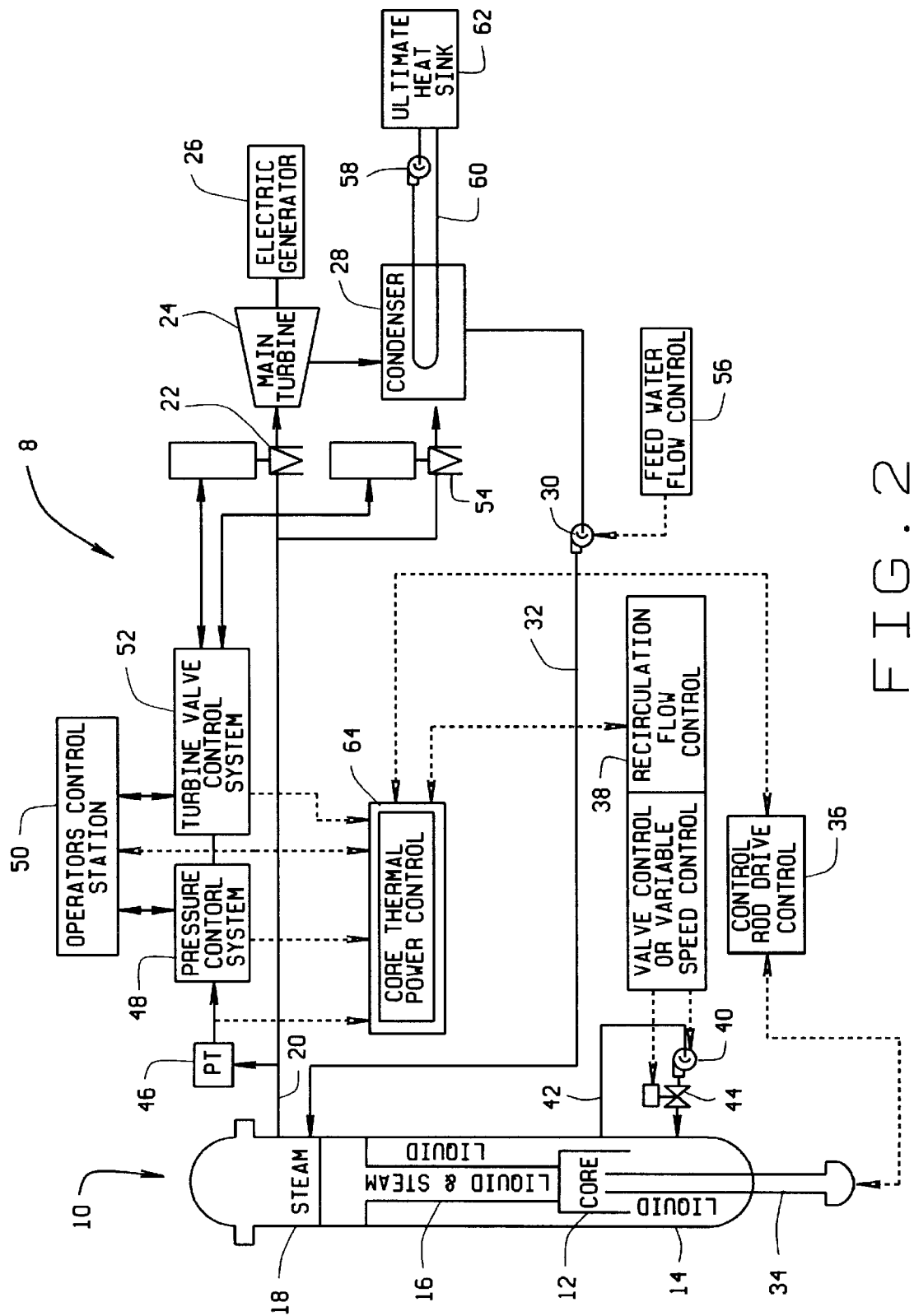
FIG. 2 is a schematic flow diagram of a power generating system showing a BWR with core thermal power modulation pressure control.

FIG. 2 is a schematic flow diagram illustrating core thermal power modulation pressure control of power generating system 8 in accordance with one embodiment of the present invention. As described above, power generating system 8 includes BWR 10 that produces steam 18. Steam 18 flows from BWR 10 through steam path 20 to and through turbine control valve 22 to turbine 24 then to condenser 28 where steam 18 is converted to liquid water 14. Liquid water 14 then flows back to BWR 10 through feedwater flow path 32. Condenser water flow path 60, containing pump 58, connects condenser 28 with heat sink 62. Condenser water is pumped by pump 58 from condenser 28 to heat sink 62 and back to condenser 28 in closed loop flow path 60. Turbine 24 drives electric generator 21 generating electric power. Bypass valve 54 permits steam to flow directly from BWR 10 to condenser 28 bypassing turbine 24.

A control rod drive 34 and control rod controller 36 change control rod density within core 12 of BWR 10 to vary or modulate the thermal output from core 12. Water recirculated through core 12 also is used to control thermal output. A recirculation pump 40 pumps water through piping in a recirculation flow path 42. Typically, recirculation pump 40 is a variable speed pump which provides for control and modulation of the recirculation water flow rate. A flow control valve 44 for controlling recirculation flow rate is also included in recirculation flow path 42. Recirculation controller 38 controls the speed of recirculation pump 40 and the operating open position of flow control valve 44.

A pressure sensor 46 measures steam pressure in flow path 20. Operator control station 50 communicates with a pressure controller 48, a turbine valve controller 52 and a core thermal power controller 64.

In turbine control valve modulation mode, system steam pressure is controlled by first measuring the steam pressure in steam path 20 with pressure sensor 46 which inputs the reading into pressure controller 48. A pressure setpoint is put into pressure controller 48 by the operator at operator control station 50. If the pressure is higher or lower than the setpoint pressure, a signal is sent to turbine valve controller 52 which in turn sends a signal to the main turbine control valve 22 to open or close. Opening turbine control valve 22 allows more steam into turbine 24 and thus lowers system pressure. Closing turbine control valve 22 creates higher pressure in the system.

A boiling water reactor power generation plant may have more than one turbine control valve 22. Typically there are four turbine control valves 22 in the system which operate in either full arc mode where all valves move together, or partial arc mode where one or more valves modulate and the remaining valves stay in a full open position.

Also, if a system safety pressure setpoint is exceeded, a signal is sent to bypass valve 54 to open to divert steam directly to condenser 28, bypassing turbine 24, and thereby lowering system pressure. Recirculation flow control 38 sends a signal to either variable speed recirculation pump 40 or to control valve 44 to control recirculation flow rate and thereby maintain a constant thermal output from core 12. Condenser 28 operates by condenser water removing thermal energy from steam 18 flowing from turbine 24 thereby converting steam 18 to water 14. The condenser water is pumped by a condenser pump 58 through piping in a closed loop flow path 60 from condenser 28 to a heat sink 62 and back to condenser 28. Heat sink 62 dissipates the thermal energy from the condenser water before it is recirculated to condenser 28.

Typically, changeover from conventional control valve modulation pressure control mode, described above, to core thermal power modulation pressure control mode is effected by the plant operator at operator control station 50. However, changeover to core power modulation mode may be effected automatically when predetermined requirement parameters are satisfied.

Steam pressure in steam flow path 20 is measured by pressure sensor 46 which sends an input to pressure controller 48 and core thermal power controller 64. Pressure controller 48 sends a signal to turbine valve controller 52 which in turn sends a signal to main turbine control valves 22 to open to a constant position. Control valves 22 are usually set to wide open, but may be set to any other constant setting. Control valves 22 are typically set to at least 75 percent of wide open.

To moderate core thermal power, core thermal power controller may either control core power by moderating control rod density within the reactor or may moderate recirculation water flow rate through reactor core 12. To moderate control rod density, a signal is sent by core thermal power controller 64 to control rod drive controller 36. Control rod drive controller 36 then directs control rod drive 34 to either raise or lower the control rods thereby changing or modulating the control rod density in reactor core 12. The core thermal power is inversely proportional to control rod density. For example, as the control rod density increases thermal power decreases, and conversely as control rod density decreases, core thermal power increases.

To moderate recirculation flow rate, core thermal power controller 64 sends a signal to recirculation flow controller 38. Controller 38 then causes variable speed pump 40 to change speed thus modulating recirculation flow rate. Alternatively, controller 38 sends a signal to recirculation control valve 44 to modulate the open position of valve 44, thus modulating the recirculation flow rate of water through reactor core 12. Modulating recirculating water flow rate modulates reactor core thermal power output.

Figure 3:
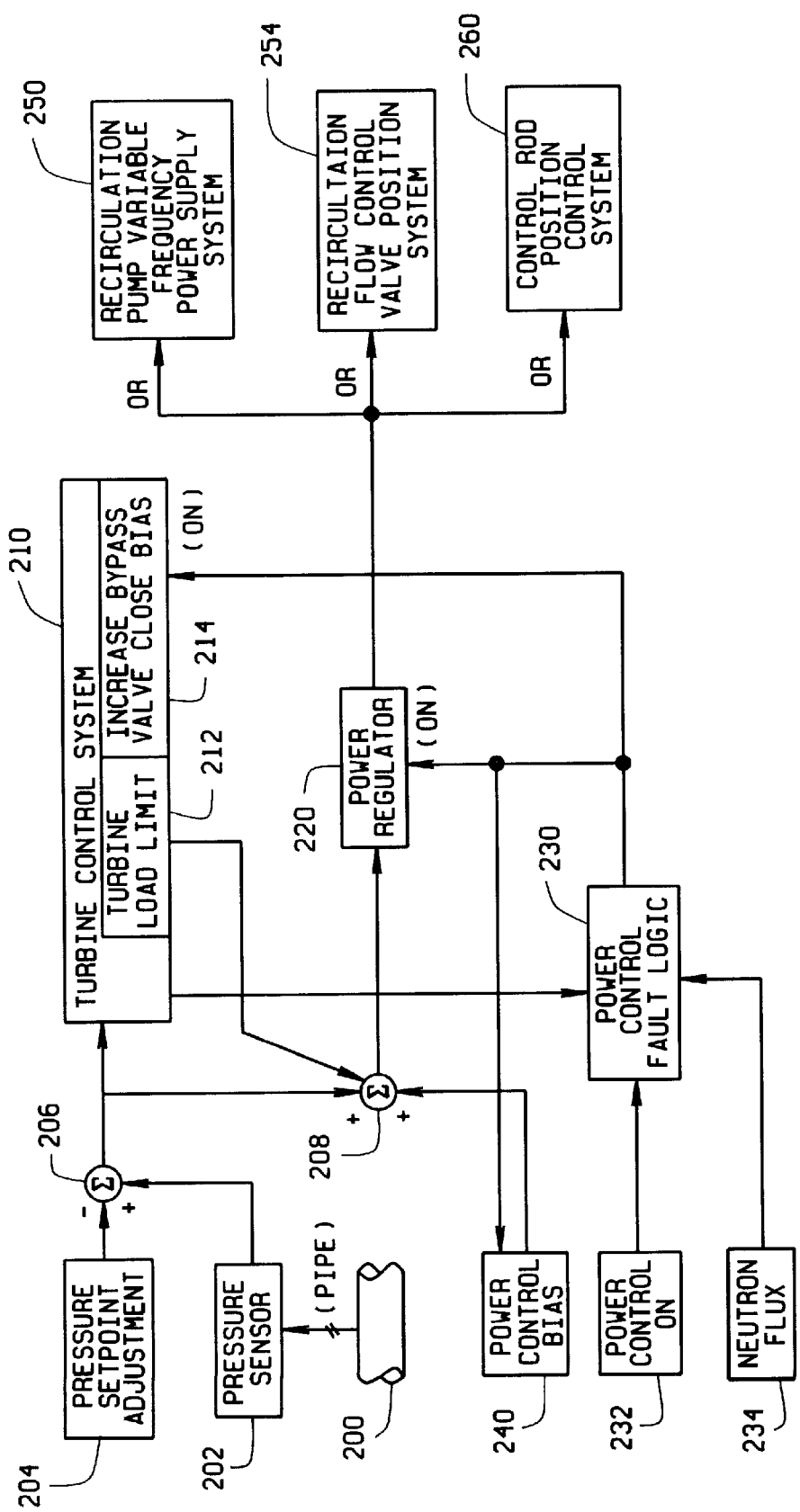
FIG. 3 is a schematic control diagram showing pressure control by core power modulation for a BWR.

FIG. 3 is a schematic functional control block diagram illustrating core thermal power modulation pressure control of power generating system 8 in accordance with an exemplary embodiment of the present invention. FIG. 3 illustrates function blocks for a sensed system pressure 200, a steam line pressure sensor 202, a pressure setpoint adjustment 204, and a summer or compensator 206. These function blocks are typically included in a conventional pressure regulation function which provides a steam flow demand signal to the turbine control system 210. As known in the art, turbine control system 210 may typically include a valve position characterizer, a valve position controller, an electric signal to hydraulic flow converter, a hydraulic cylinder, flow control valves, a valve position sensor, and a hydraulic power unit. Turbine control system 210 also includes a turbine load limit setpoint 212 function block and an increase bypass valve close bias 214 function block. If the pressure increases over the turbine load limit setpoint 212, and the increase is over the bypass close bias, the bypass valves will open routing steam directly to the condenser.

FIG. 3 also illustrates power regulator 220, power control fault logic 230, power control on 232, neutron flux 234 and power control bias 240 function blocks. Function blocks for recirculation pump variable speed control system 250, recirculation flow control valve position control system 254, and control rod position control system 260 are also illustrated.

In operation, steam pressure in pipe 200 is measured by pressure sensor 202 which sends a signal to summer or compensator 206 which compares the pressure to pressure setpoint 204. A signal is then sent to the turbine control system 210 and to summer 208. When core power control 232 is turned on, power control fault logic 230 is activated. Power control fault logic 230 will monitor power control system 220 for control system failures, position of the bypass valves, level of neutron flux 234, and power control system 220 operating parameters for acceptable values. If a variable is out of tolerance or a control system hardware is in a failed condition, power control logic 230 will not allow transfer to core power modulation mode. Also, if the plant is operating in the power control mode, fault logic 230 will automatically transfer back to turbine control valve modulation mode to maintain acceptable system pressure. When power control mode on 232 is turned on, a power control bias 240 will add a set signal to summer 208 which also receives the value of turbine load limit 212. These signals are summed with the pressure error signal from summer 206. The control signal from summer 208 is input to the power regulator 220 which, for example, may be a proportional plus integral controller. The output from the power regulator 220 is provided to one of the power control systems which can be either the recirculation pump variable speed system 250, the recirculation flow control valve position system 254, or the control rod position control system 260.

Figure 4:
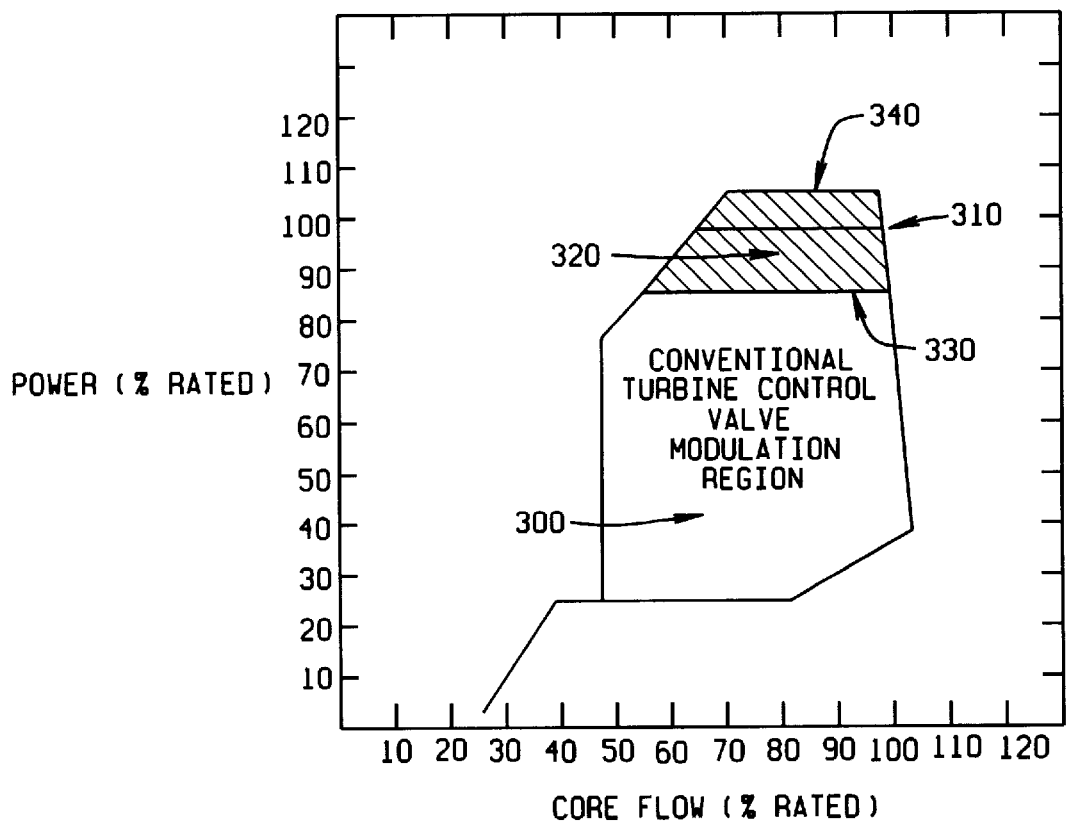
FIG. 4 is a graph of percent of rated power versus core flow illustrating the domain of operation of a BWR with core power modulation pressure control.

FIG. 4 illustrates an operational relationship between the percent of rated reactor core power versus the percent of rated core flow for a BWR. The operational domain of conventional turbine control valve modulation pressure control 300 has an upper boundary of line 310 which represents the operating power limit for control valve modulation mode.

The operational domain of core thermal power modulation pressure control 320 has a lower boundary line 330. Line 330 is based on an acceptable system stability and plant transient behavior during transfer from core thermal power modulation mode to turbine control valve modulation mode. The upper boundary line 340 of domain 320 represents the maximum power generated with thermal power modulation mode pressure control. As illustrated in FIG. 4, the maximum power generated from a BWR using thermal power modulation pressure control is greater than if turbine control valve power modulation pressure control is used.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of controlling the system pressure in a power generating system comprised of a turbine-generator and a boiling water reactor, the boiling water reactor including a pressure vessel containing a nuclear fuel core, control rods, and a recirculation flow control system, the power generating system configured so that a core thermal power converts water into steam for driving the turbine-generator to produce electric power, and steam is converted back to water and returned to the boiling water in a closed loop, the turbine-generator includes main turbine control valves to control steam input into the turbine generator, the system pressure being controlled in a turbine control valve modulation pressure control mode, said method comprising the steps of:

setting the main turbine control valves to a constant and steady position greater than 75% of wide open; and controlling the system pressure to be within a predetermined range by utilizing a core thermal power modulation mode, the core thermal power modulation mode comprising adjusting the core thermal power of the reactor.

2. A method in accordance with claim 1 wherein setting the main turbine control valves to a constant steady position comprises the step of setting the turbine control valves to a wide open position.

3. A method in accordance with claim 1 wherein adjusting the core thermal power comprises the step of adjusting control rod density within the reactor core.

4. A method in accordance with claim 1 wherein adjusting the core thermal power comprises the step of adjusting the recirculation water flow rate through the reactor core.

5. A method in accordance with claim 4 wherein adjusting the recirculation water flow rate through the reactor core further comprises the step of adjusting the input to the recirculation flow control system.

6. A method in accordance with claim 5 further comprising the step of adjusting recirculation water flow by modulating a variable speed recirculation pump.

7. A method in accordance with claim 5 further comprising the step of adjusting recirculation water flow by modulating a recirculation water flow control valve.

8. A method in accordance with claim 1 further comprising the step of automatically modifying a bypass valve closure bias and a power control bias to accommodate variances from the reactor core thermal power modulation pressure control mode over the turbine control valve modulation pressure control mode.

9. A method in accordance with claim 1 further comprising the step of transferring system pressure control from the core thermal power modulation pressure control mode to the turbine control valve modulation pressure control mode when pressure transients are outside of a predetermined range.

10. A method of controlling the system pressure in a power generating system comprised of a turbine-generator and a boiling water reactor, the boiling water reactor including a pressure vessel containing a nuclear fuel core, control rods, and a recirculation flow control system, the power generating system configured so that core thermal power converts water into steam for driving the turbine-generator to produce electric power, and steam is converted back to water and returned to the boiling water reactor in a closed loop, the turbine-generator includes main turbine control valves to control steam input into the turbine-generator, the system pressure being controlled in a turbine control valve modulation pressure control mode, said method comprising the steps of:

converting to a core thermal power modulation pressure control mode;

setting the main turbine control valves to a constant and steady position greater than 75% of wide open; and controlling the system pressure to be within a predetermined range by adjusting the core thermal power of the reactor.

11. A method in accordance with claim 10 wherein converting to the core thermal power modulation pressure control mode comprises the step of modifying a bypass valve closure bias and a power control bias to accommodate variances from the reactor core thermal power modulation pressure control mode over the turbine control valve modulation pressure control mode.

12. A method in accordance with claim 10 wherein setting the main turbine control valves to a constant steady position comprises the step of setting the turbine control valves to a wide open position.

13. A method in accordance with claim 10 wherein adjusting the core thermal power comprises the step of adjusting control rod density within the reactor core.

14. A method in accordance with claim 10 wherein adjusting the core thermal power comprises the step of adjusting the recirculation water flow rate through the reactor core.

15. A method in accordance with claim 14 wherein adjusting the recirculation water flow rate through the reactor core further comprises the step of adjusting the input to the recirculation flow control system.

16. A method in accordance with claim 15 further comprising the step of adjusting recirculation water flow by modulating a variable speed recirculation pump.

17. A method in accordance with claim 15 further comprising the step of adjusting recirculation water flow by modulating a recirculation water flow control valve.

18. A method in accordance with claim 10 further comprising the step of transferring system pressure control from the core thermal power modulation pressure control mode back to the turbine control valve modulation pressure control mode when pressure transients are outside of a predetermined range.

* * * * *